United States Patent [19]

Bettcher

[11] 4,186,462
[45] Feb. 5, 1980

[54] TENDERIZER

[75] Inventor: Louis A. Bettcher, Amherst, Ohio

[73] Assignee: Bettcher Industries, Inc., Birmingham, Ohio

[21] Appl. No.: 714,026

[22] Filed: Aug. 13, 1976

[51] Int. Cl.² ............................................. A22C 9/00
[52] U.S. Cl. ..................................................... 17/25
[58] Field of Search ............................... 17/25, 28, 30

[56] References Cited
U.S. PATENT DOCUMENTS

| | | | |
|---|---|---|---|
| 3,654,664 | 4/1972 | Fetzer et al. | 17/25 |
| 3,719,504 | 3/1973 | Greenspan | 17/25 |
| 3,736,583 | 5/1973 | Smith et al. | 17/25 |

Primary Examiner—Robert Peshock
Attorney, Agent, or Firm—Watts, Hoffmann, Fisher & Heinke Co.

[57] ABSTRACT

An apparatus for tenderizing a comestible product, such as meat, comprising an intermittently advanced conveyor for conveying a product to be processed underneath a set of thin knives supported for vertical reciprocation toward and away from the conveyor by a knife carrier or carriage having three horizontal plate-like members fixed in vertical spaced relation to one another having a multiplicity of closely spaced vertically aligned apertures and discrete blade or knife assemblies each comprising a rod member slidable in each of the aligned apertures of the upper plate-like members and extending to opposite sides thereof. The rod members each having a flange at the upper side of the intermediate plate-like member normally engaging the same. A discrete compression spring surrounding each of the rod members and interposed between the flange thereon and the under side of the upper plate-like member which is adjustable towards and from the intermediate plate-like member. A further horizontal plate-like member below the lower plate-like member supported by the knife carrier for limited movement towards and from the knife carrier and having apertures therein through each of which an individual knife extends. A product stripper plate arranged to move downwardly and upwardly in coordination with like movements of the knife carrier and to rest upon the upper surface of the product being pierced and to be locked in said position while the knives are withdrawn from the product. The aforementioned further horizontal plate reduces the length of knife shank which would otherwise be unsupported against bending during operation on a product.

10 Claims, 14 Drawing Figures

TENDERIZER

BACKGROUND OF THE INVENTION

Field of the Invention

The invention relates to apparatus for tenderizing comestible products, such as, for example, meat, by piercing and/or cutting the product from one side simultaneously by a multiplicity of thin needles or knives. A number of machines for tenderizing pieces or cuts of meat with and/or without bone therein employing a multiplicity of series of thin closely arranged knives for simultaneously making a plurality of cuts in a meat product are known. Such machines preferably utilize very thin knives so that the incisions made in the meat will be small and will reclose by the natural adhesion of the product when the knives are withdrawn thus causing the meat to regain its original appearance.

Due to the considerable force imposed on the delicate tenderizing knives only relatively thin pieces or cuts of meat have been heretofore tenderized in this manner.

SUMMARY OF THE INVENTION

The present invention provides an apparatus or machine for tenderizing a thick comestible product, such as, meat, with or without bone therein, utilizing a plurality of thin knives for simultaneously producing a multiplicity of small incisions in the comestible product from one side thereof. The incisions are of the size heretofore referred to and reseal themselves after the knives are withdrawn. The knives are stabilized between their ends during the piercing operation thus making it possible to tenderize without undue buckling or bending of the knives comestible products having a thickness two or more times that which it was possible to so tenderize by prior machines.

Further objects and advantages of the invention will be apparent from and/or will be referred to in the following description of the preferred embodiment of the invention.

DESCRIPTION OF THE PREFERRED EMBODIMENT

The preferred embodiment of the invention comprises a main frame A including four vertical corner posts 20, parallel bottom side frame members 22, parallel top side frame members 24, parallel bottom end members 26, top end member 28, and sufficient bracing members to provide a substantially rigid framework. A product conveyor including two parallel side rails 30 is supported by the top end member 28. The side rails 30 are tied together by a plurality of crossbars 32. A conveyor drive shaft 34 having a plurality of conveyor engaging sprockets 36 secured thereto to rotate therewith is rotatably mounted in the side rails 30 adjacent to their right-hand ends as viewed in FIG. 1. A drive sprocket 38 is fixed to the shaft 34 near its far end. An idler roll shaft 40 is rotatably mounted in the side rails 30 adjacent to their other ends and carries a plurality of idler sprockets aligned with the sprockets 36 at the drive end. A conveyor belt 42 of open wire mesh passes around the sprockets at opposite ends of the side rails 30 and has an upper working run or reach adapted to travel in the direction away from the drive end and a return run traveling in the opposite direction. Suitable conveyor belt supports are provided between the side rails 30 along which the wire mesh belt slides.

Knife and product hold-down or stripper carriages designated generally by the reference characters B and C, respectively, are supported for vertical reciprocation by an upstanding framework which consists essentially of two parallel upright channels 50 secured firmly to the main frame of the machine at their lower ends and connected together at their upper ends by members 52. The knife carriage B is guided in its vertical reciprocation by four guide rollers or wheels 60 rotatably connected to the knife carriage and engaged with and adapted to roll along two parallel guide rails 62 one secured to the web of each of the channels 50 centrally thereof. The stripper carriage C has four guide rollers or wheels 64 rotatably connected thereto which also engage and roll along the two parallel guide rails 62.

Figure 3:
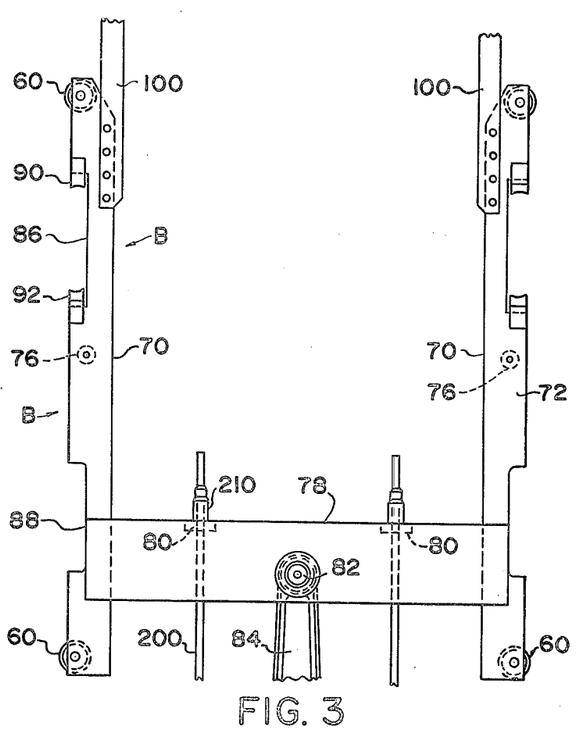
FIGS. 3 and 4 are respectively front and side elevational views of the knife carriage.
Figure 4:
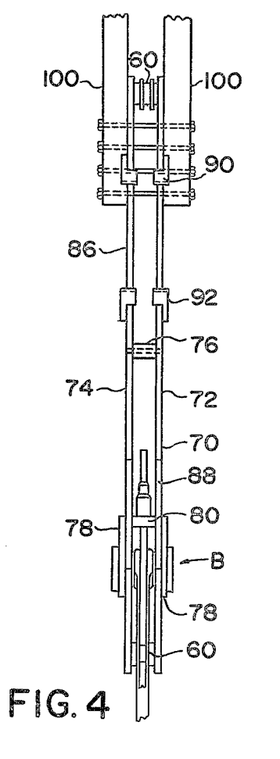

The knife carriage B, as best shown in FIGS. 3 and 4, comprises two vertically positioned side members 70 each made up of two spaced, parallel plates 72,74, each pair of which plates are secured together intermediate their ends by a spacer 76. At their lower ends the side members 70 are connected together by a pair of parallel plates 78. Rigidly connected between the plates 78 are two spaced unlocking spool brackets 80. Centrally of the plates 78, they are provided with a suitable pin 82 for securing to the knife carriage B the upper end of a ram drive connecting rod 84 which provides the vertical reciprocation for the knife and stripper carriages. The guide rollers 60 are provided with suitable spacers to position the guide wheels or rollers 60 centrally between plates 72,74. Vertically spaced recesses 86,88 are provided in the side plates 72,74 to accommodate the guide rollers 64 of the stripper carriage. Bumpers 90 are provided on the upper sides of the recesses 86 to limit the upward movement of the stripper carriage relative to the knife carriage. Bumpers 92 are provided at the lower sides of the recesses 86 to engage the upper guide rollers 64 of the hold-down carriage to lift the stripper carriage upon upward movement of the knife carriage.

Figure 8:
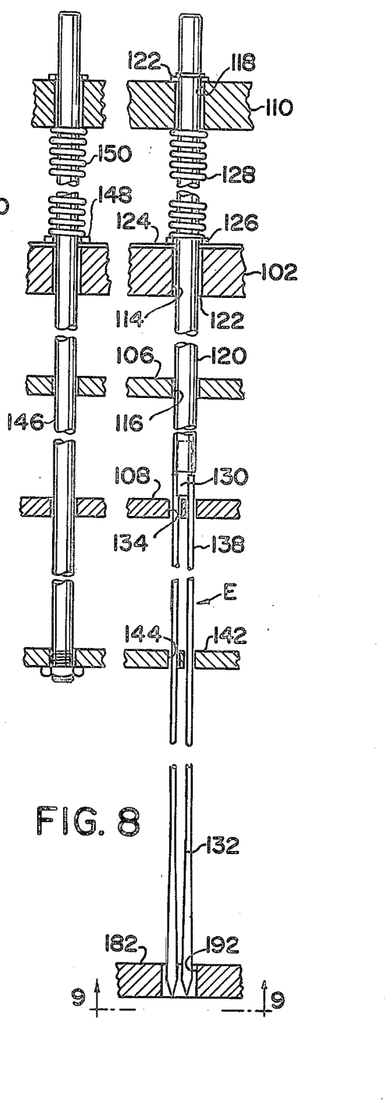
FIG. 8 is an enlarged fragmentary sectional view with parts in elevation approximately on the line 8—8 of FIG. 7.
Figure 9:
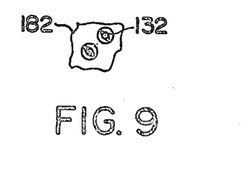
FIG. 9 is a view on the line 9—9 of FIG. 8.

The knife carriage B includes a cutter head unit D comprising four vertically extending members 100 the lower ends of which are connected to the upper ends of the plates of the side members 70 of the knife carriage. The upper ends of the members 100 are connected together by a horizontal plate 102 resting thereon and connected thereto by bolts 104. Two horizontal plates 106,108 spaced vertically with respect to one another and below the plate 102 and a further horizontal plate 110 spaced above the plate 102 are connected to one another and the plate 102 by four rod members 112. The plates 102, 106 and 110 have closely spaced aligned apertures 114, 116, 118, see FIG. 8 therethrough forming a multiplicity of series of closely spaced apertures. The center to center spacing of the apertures in the plates 102, 106, 100 is preferably about two centimeters (2 cm). A rod member 120 forming a part of a knife assembly designated generally by the reference character E is slidably supported in each of a plurality of said series or set of aligned apertures. The members 120 preferably are of a diameter equal to about seventy to eighty millimeters (70-80 mm.) and fit loosely within their supporting apertures but without undue play. In the embodiment shown the apertures in the plate 110 through which the members 120 extend are provided with plastic bushings 122 having top end flanges in engagement with upper surface of the plate 110. Similar bushings may be employed in the corresponding apertures in the plate 102. As shown, a plastic plate 124 resting upon the top surface of the plate 102 is employed in place of bushings. The apertures 114 in the plate 102 are larger than the diameters of the members 120 whereas the apertures in the plate 124 are such that the members 120 slide freely therein without undue play. Each of the members 120 has intermediate its end a collar 126 connected thereto. The collar 126 normally engages the upper surface of the plate 124 to limit the downward movement of the members 120 and in turn the knife assemblies E of which they are a part relative to the plate 102.

Each member 120 is biased in a downwardly direction by a preloaded coil type compression spring 128 surrounding the member and interposed between the collar 126 and the underside of the plastic bushing 122. The upper ends of the rod members 112 are threaded and the plate 110 is connected thereto by jam nuts located above and below the plate thus providing for adjustment of the plate 110 to and from the plate 102 to vary the preloading and/or bias of the springs 128. The preload or bias of individual springs 128 can be adjusted by shims interposed between the upper and/or lower ends of the springs and the members against which they otherwise abut. In the embodiment of the invention shown the rod members 120 have a diameter of about seventy to eighty millimeters (70-80 mm.).

The springs 128 employed in the preferred embodiment of the invention limits the force which can be applied by the individual knives or pairs of knives to a product being tenderized. This is important as excessive force applied by a knife might cause the knife to chip a bone in a bone-in meat product being tenderized or damage the knife. For example, break the knife or bend the knife shank. The fact that a force of increasing amount continues to be applied to a knife when its penetration of a product being tenderized, such as, a ham, has been arrested due to the knife striking a part of the product offering a high resistance to penetration, for example, a layer of skin, a tendon, or the like, is advantageous as long as the force does not exceed the strength capabilities of the knife because at some point the force may reach that required to initiate and/or effect further penetration of the product. In place of the springs employed in the preferred embodiment illustrated other devices having like or different operating characteristics may be used to limit or release altogether the force applied to a product being tenderized by the tenderizing knives, for example, pressure fluid as disclosed in U.S. Pat. No. 3,535,734 or a conventional overload release device of the type disclosed in U.S. Pat. Nos. 3,516,642, 2,753,969, 3,011,654, 3,011,655, and the like.

Each of the tenderizing knife assemblies E also comprises a member 130 preferably detachably connected to the lower end of the member 120. Each member 130 has two tenderizing knives 132 fixed thereto. The knives extend downwardly through individual openings 134 in the plate 108 which openings are in alighment with the openings in the plates 102, 106, 110. Each tenderizing knife has a long small diameter cylindrical shank 138 and at its lower end a relatively wide flat thin spear-like or bullet-shaped pointed blade 140 provided with cutting edges along the entire length of its two sides diverging from the point in the direction of the shank. The shape of the blades 140 is such as to prevent bone chipping and bending or fishhooking of the points. The shanks 138 of the knives 132 are preferably about two and three-tenths millimeters (2.3 mm.) in diameter and the blade parts 140 are about five millimeters (5 mm.) wide and six-tenths millimeters (0.6 mm.) thick. In the embodiment shown the knives 132 are connected to the member so that their blades are parallel with one another but other arrangements are contemplated. In the apparatus shown the knife assemblies E are on about nineteen millimeter (19 mm.) centers resulting in a knife or blade density of about seven-tenth (0.7) per square centimeter.

The cutter head unit D is provided with a further horizontal plate 142 located below the plate 108 and having a series of apertures 144 similar to and aligned with the apertures 134 in the plate 108 and through which apertures 144 the knives 132 extend. The plate 142 is connected to the lower ends of four rods 146 extending vertically through suitable apertures in plates 102, 106, 108 and 110. Collars 148 located above the plate 124 and connected to the rods 146 limits downward movement of the rods 146 and in turn the plate 142 relative to the plate 108, etc. The limit of the downward movement of the plate 142 relative to the plate 108 is preferably about one-half the length of the knives 132. In the embodiment shown the rods 146 and in turn the plate 142 are biased in a downwardly direction by compression springs 150 interposed between the collars 148 and the plate 110.

As previously mentioned the present invention provides an apparatus for tenderizing products, especially meat, which are thicker than was heretofore possible with prior apparatus using knives of the type described. To this end the knives 132 are longer than any knives heretofore employed and may be from 25 to 50 or more centimeters long. With the plate 142 movable to a position below the plate 108 a distance equal to about one-half the length of the knives 132 never more than about one-half of the shank of a knife is exposed and unsupported or unguided against flexing and/or bending. In the case of very long knives two or more plates similar to the intermediate knife stabilization and/or guiding plate 142 may be employed spaced vertically from one another. One construction would be to have such plates slidable on the rods 146 and spaced from the plate 142 and/or one another by light compression springs surrounding the rods between the plates or on separate rods similar to 146. It will be noted that the knife assemblies E are slidably supported in plastic parts thus eliminating metal to metal contact and may be removed individually as required.

Figure 5:
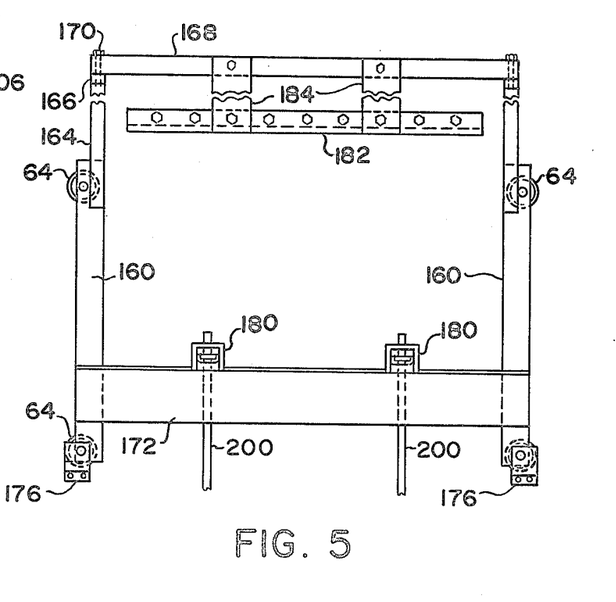
FIGS. 5 and 6 are respectively front and side elevational views of the product hold-down carriage.
Figure 6:
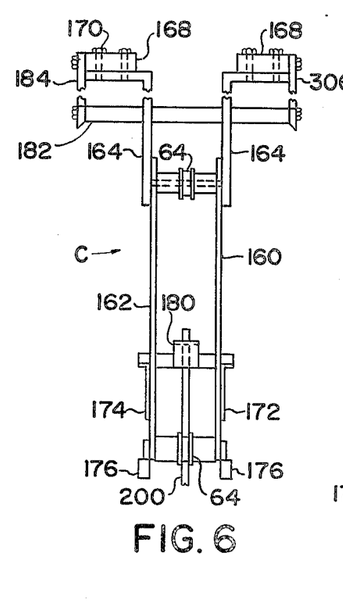
Figure 7:
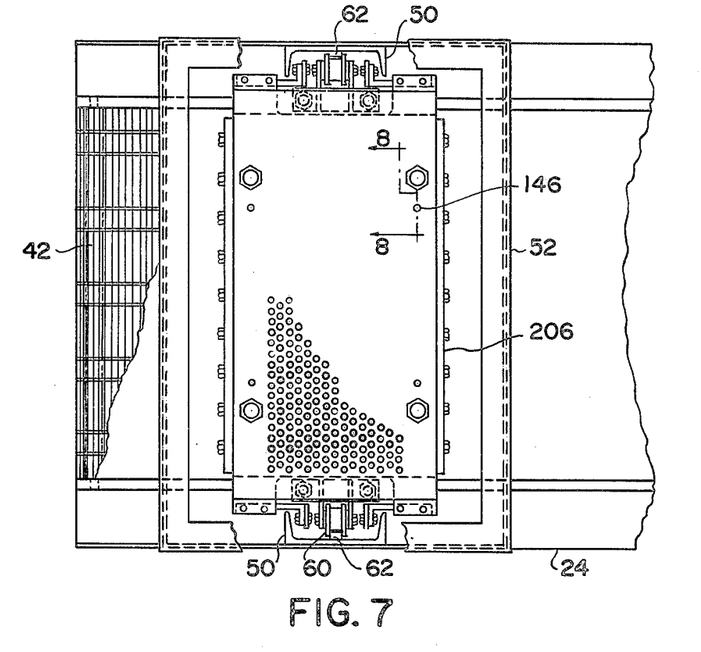
FIG. 7 is a fragmentary to plan view of the apparatus as shown in FIG. 1.

The stripper carriage C, see FIGS. 5 and 6, comprises a pair of parallel vertical plates 160, 162 at each side of the upper end of which are connected narrow angle brackets 164 having outwardly projecting parts 166 at their upper ends. The parts 166 of the brackets 164 at opposite sides of the carriage C are secured together by plates 168 connected thereto by suitable stud bolts 170. The plates 160, 162 are secured to one another intermediate their end by the spacer structures for the upper guide rollers 64, and at their lower ends by the spacer structures for the lower guide rollers 64. Near their lower ends the side plates 160 are secured to one another by a rigidly attached angle plate 172 and the lower ends of the plates 162 are connected together in a similar manner by an angle plate 174. Bumpers 176 are affixed to the lower ends of each of the vertical plates 160,162 for stopping the downward travel of the stripper carriage when they strike the stop blocks 178, see FIG. 1, fastened to the vertical channels 50. Two spaced, duplicate stripper carriage lock assemblies 180 are attached to the top flanges of the plates 172, 174 intermediate their ends. A plate 182 preferably made of plastic is bridged down from the plates 168 by vertical members 184 the upper ends of which are fixed to the plates 168 and while their lower ends are fixed to the plate 182. The plate 182 constitutes the product holddown and stripper plate and has a plurality of through perforations 192 similar to and positioned directly below one of the apertures in the plate 142 and into which apertures 192 the lower ends of the blades or knives 132 may normally project.

The lock assemblies 190 previously referred to are provided for locking the stripper carriage C and in turn the product engaging plate 182 relative to the frame of the machine while the tenderizing blades are being withdrawn upwardly out of a product being tenderized. Each lock assembly 190 comprises a frame 192, in which two locking pawls 194 are pivotally mounted by pins 196 connected to opposite sides of the frame. The free ends of the pawls are adjacent to one another and are provided with arcuate locking recesses 198 which in the closed position of the pawls shown in FIG. 10 encompass a circular periphery adapted to lock tightly upon one of two vertically extending locking rods 200 the lower ends of which are connected to brackets 202 pivoted at one of their ends in a frame spacer bar 204 and at their other ends in a power mount support 206. Each of these locking rods 200 passes upwardly through the unlocking spool support member 80 of the knife carriage B and through an unlocking spool 210, freely slidable on the locking rod, and then through the associated locking assembly 190 and upwardly therebeyond.

Figure 10:
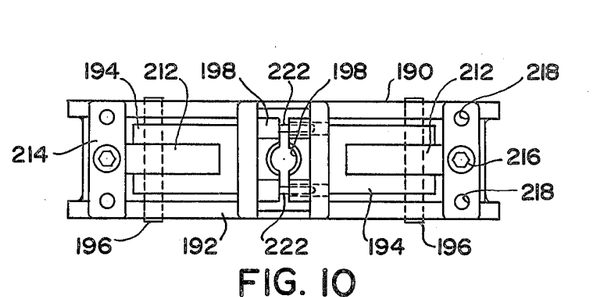
FIG. 10 is an enlarged top plan view of one of the hold-down carriage lock assemblies.

Each of the pawls 194 is normally urged to its locking position shown in FIG. 10 by a leaf spring 212, fixed to the frame 192 by a spring clip 214 held in position by a stud bolt 216. Openings 218 are provided for bolting the frames 192 to the cross angles 172,174. The locking pawls are moved to an unlocking position shown in FIG. 11 by the unlocking spools 210 as they are lifted upwardly by the brackets 80 as the knife carriage lifts the tenderizing blades out of the product being tenderized. The upper ends of the locking spool enter into recesses 220 on the undersides of the associated locking pawls, thus lifting them upwardly against the bias of the springs 212. During such lifting of the locking pawls, they are held in proper alignment by dowel pins 222 fixed in one of the pawls of each lock assembly and projecting in a suitable recess in the other pawl.

Figure 1:
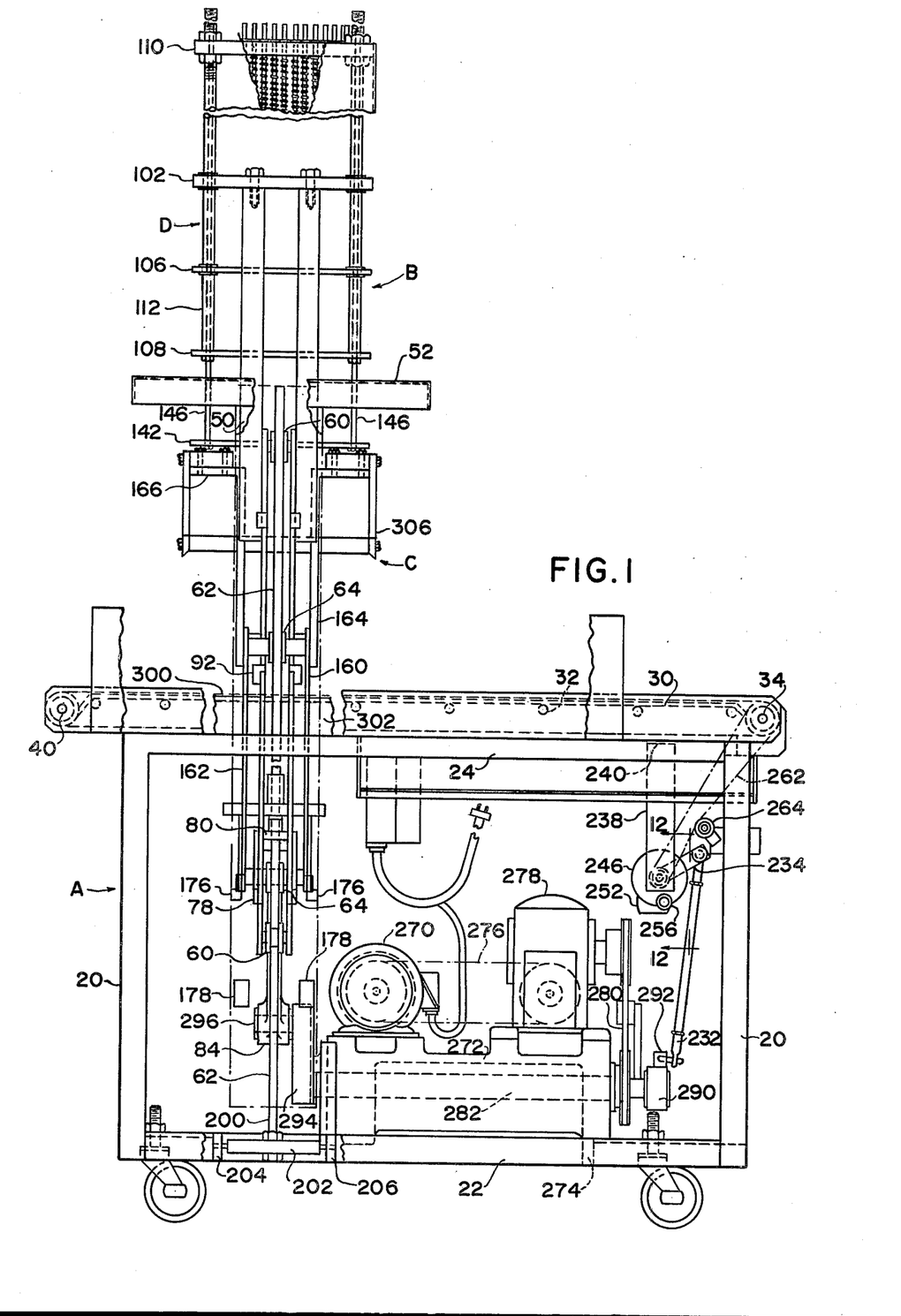
FIG. 1 is a side elevational view of an apparatus embodying the present invention.
Figure 12:
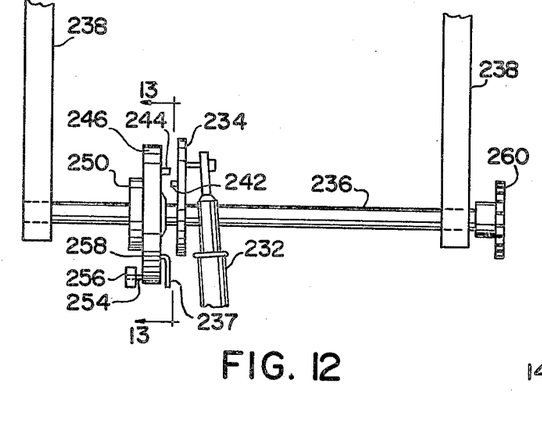
FIG. 12 is an enlarged fragmentary view approximately on the line 12—12 of FIG. 1.
Figure 13:
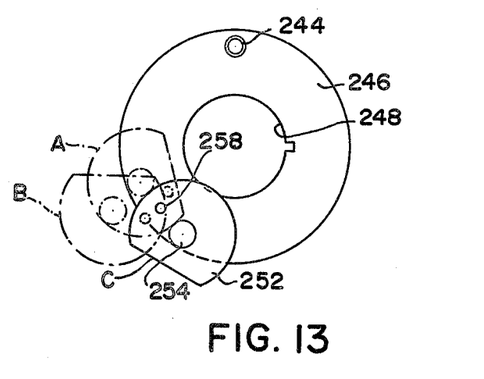
FIG. 13 is an enlarged fragmentary view approximately on the line 13—13 of FIG. 12.

Mechanism is provided for causing the upper run of the conveyor belt 42 to intermittently travel in the direction of the arrow of FIG. 1 when the tenderizing blades are in their uppermost position. This mechanism includes a drive link 232, the upper end of which is pivotally connected with the free end of a drive lever 234 rotatable on a drive shaft 236 which in turn is rotatably mounted in parallel brackets 238 extending downwardly from and supported by a frame member 240. The lever 234 carries a pin 242, best shown in FIG. 12 adapted to drivingly engage a pin 244 on a clutch drive ring 246. The ring 246 has a center opening 248 in which is received the outer drive member of a unidirectional clutch 250 having a radially innnermost member secured to the shaft 236. The outer drive member of the clutch 250 is keyed to the member 246. The clutch 250 is so arranged that, as viewed in FIG. 1, the driving action only occurs when the drive ring 246 moves in a counterclockwise direction. The clutch shown is a one way clutch. The idle movement of the clutch drive ring 246 is caused by clockwise movement of the drive lever 234 as viewed in FIG. 1. This is controlled by a feed adjustment disc or cam 252 pivotally mounted about a pin 254 fixed on the drive ring 246 the adjustment of which is controlled by a knob 256 affixed to the end of the pin 254. In the embodiment shown, three possible positions are indicated respectively in full line, dot-dash lines and dot-dot-dash line in FIG. 13. A spring pressed detent 258 is fixed in ring 246 and drops into an appropriate recess in the feed adjustment disk 252 in each of the three positions shown. Referring to FIGS. 1, 12 and 13, it will be seen that movement of the pin 242 on lever 234 in a clockwise direction as shown in FIG. 1, which would be counterclockwise of ring 246 in FIG. 13, will strike the disc 252 either at point A, B or C depending upon the position of disc 252. If this occurs at point A, then obviously the drive ring 252 will be moved through a greater arc than if the engagement occurs at point B or C. The following drive stroke of lever 234 will cause pin 242 of lever 234 to engage pin 244 of ring 246 to turn the drive ring 246 clockwise in FIG. 13 the predetermined amount which will drive the conveyor a predetermined distance as hereinafter explained. At one end of shaft 236 there is mounted a drive sprocket 260 connected by a drive chain 262 to sprocket 38 mounted on the shaft 34 which as previously described causes driving movement of the conveyor belt engaging sprockets 36 on the shaft 34. A spring pressed idler 264 provides take-up for the drive chain 262.

A common drive means is employed for causing movements of the knife and stripper carriages B, C and the conveyor belt 42 comprises a motor 270 mounted on a base 272 which in turn is supported on the member 206 and another mounting member 274. The motor 270 is connected by a belt drive 276 to a power reduction gearing 278 also mounted on the base 272. The output shaft of the reduction gearing is connected by a sprocket chain drive 280 to the main drive shaft 282. An idler 284 on a pivoted L-shape bracket 286 is provided for taking up slack in the chain of the drive 280.

A member 290 on the right-hand end of the shaft 282, as viewed in FIG. 1 carries the crank arm 292 to which the lower end of the member 232 is connected. The left-hand end of the shaft 282 as viewed in FIG. 1 is provided with a crank arm 294 having a crank pin 296 connected with the lower end of the connecting rod 84, the upper end of which is connected to the ram carriage at pin 82 as previously described. The arrangement of the parts is such that the intermittent movement of the conveyor 42 occurs while the knife carrier B is undergoing the upper portion of its travel and the tenderizing blades 132 is well above the meat product on the conveyor 42.

A suitable anvil 300 is provided beneath the upper run of conveyor belt 42 at the zone where the tenderizing blades come down through the meat. The anvil 300 is secured to anvil support 302 connected to the frame of the apparatus and firmly supports the meat product against the downward thrust of the tenderizing blades, which do not quite touch the conveyor belt 42.

A product height limit bar or bars, a drip pan or pans and suitable guards, etc., are provided but for the most part are not shown as their construction and location are not necessary to an understanding of the present invention. A source of power for the motor 270, and controls therefor are provided but these are all of a standard nature.

During operation of the machine each downward movement of the member 232 causes clockwise movement of the drive lever 234 as viewed in FIG. 1. This causes an idle stroke of the clutch drive ring 246, the amount of which depends upon the position of the feed adjustment disc or cam 252. During each upward stroke of the member 232, the drive lever 234 moves in a counterclockwise direction as viewed in FIG. 1 and this is transmitted through the one-way clutch 250 to the chain drive 262 and in turn to the sprocket 38 and the shaft 34 causing movement of the belt conveyor 42 a predetermined amount. In one embodiment of the invention, this increment of movement of the belt conveyor 42 may be varied between eight and four-tenths centimeters (8.4 cm.), five and six-tenths centimeters (5.6 cm.) and two and eight-tenths centimeters (2.8 cm.), depending on the positions A, B and C of the feed adjustment disc 252. These increments are respectively one-third ($\frac{1}{3}$) of one full width of the set of blades lengthwise of the machine, one-quarter ($\theta$) of that width, and one-eighth ($\frac{1}{8}$) of that width so that the product may be penetrated three (3), four (4), or eight (8) times in its travel through the apparatus, as desired. This increment of movement may be varied while the machine is running by a simple adjustment of the control knob 256.

Figure 2:
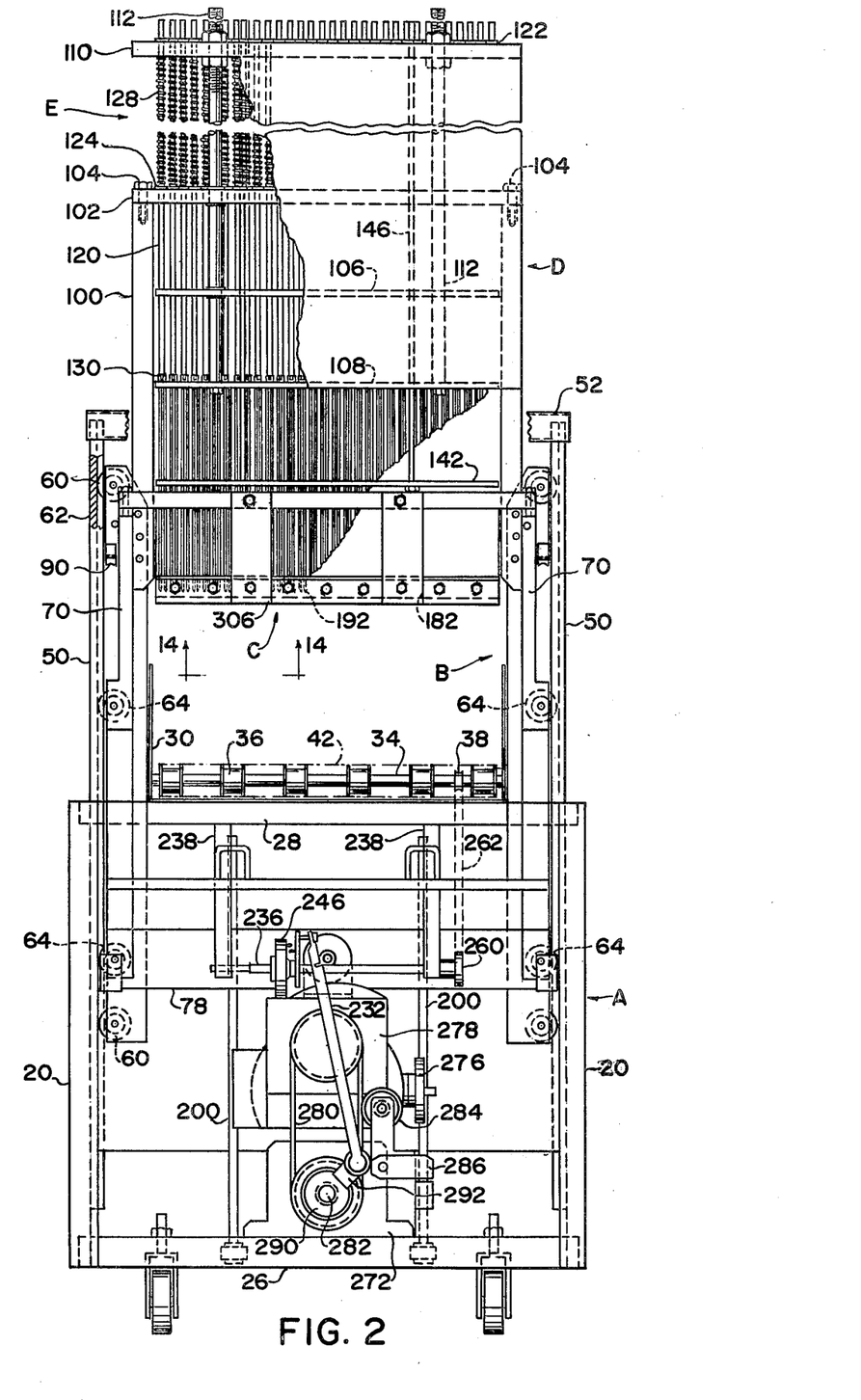
FIG. 2 is an end elevational view of the apparatus as viewed from the right-hand of FIG. 1.
Figure 11:
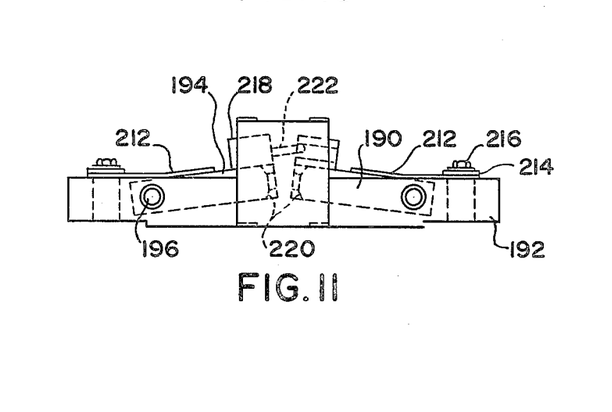
FIG. 11 is a side elevational view of the lock assembly shown in FIG. 10 with parts in a different operating position.

While the meat product is moving into the tenderizing zone on the conveyor belt 42, the knife carriage is in the uppermost position as indicated in FIGS. 1 and 2. In this position of the knife carriage in the machine illustrated the lower ends of the knives 132 are about 30 centimeters above the upper reach or run of the belt conveyor 42. In moving to this upper position, the bumpers on the knife carriage have lifted the stripper carriage upwardly by engagement of the upper guide rollers 60. The plate 141 has been carried upwardly with the knife carriage B. When the upper guide rollers 60 engage bumpers 90, the blades 132 have just about cleared at least the lower side of the hold-down or stripper plate 182, and spools 210 release the locking pawls 194 as shown in FIG. 11. With both carriages B, C in their uppermost positions rotation of shaft 282 causes the crank arm 294 to move the knife carriage B including the plate 142 downwardly. At this time, the stripper carriage moves along downwardly freely impelled by gravity until the hold-down or stripper plate 192 comes to rest on top of a product being tenderized. As the knife carriage continues downwardly the plate 142 may rest upon the stripper plate 192 depending upon the thickness of the product being tenderized. The unlocking spools 210 slide downwardly on the guide rods 200 as the brackets 80 move downwardly with the knife carriage. The locking pawls 194 up to this time have been in the unlocked position. As the unlocking spools 210 travel downwardly away from the pawls 194, the springs 212 cause the pawls 194 to move to locking position. The hold-down or stripper plate 182 then stays in a locked position relative to the frame of the machine while the knife carriage causes the tenderizing blades to pass downwardly preferably almost, but not quite, through the product and back upwardly on the return stroke until the blades are pulled out of the product, and almost out of the stripper plate. The dimensions are such that tenderizing knives 132 are never retracted into and never come in contact with the spring area of the apparatus thus reducing or avoiding possibility of contamination of the product being tenderized.

In the event one or more of the tenderizing knives strikes a bone or like impenetrable part of a product being tenderized and the force applied to the knife exceeds a predetermined amount, which as previously mentioned can be readily adjusted, the spring 128 associated therewith acts in the nature of a safety or overload release allowing the knife and the rod member 120 to which it is attached to remain stationary while the remaining knives continue their tenderizing work. The maximum force applied to any of the knives should always be less than that which will cause the knife to bend intermediate the end with the possibility that it may break. This is a function of the material of which the knives are made, their cross-section or moment of inertia, and their maximum unsupported lengths which in the embodiment shown is the maximum distance between the plates 108, 142. For knives having predetermined shank sizes and made of predetermined material optimum number of guide plates between members such as the plates 108 and 182 and their distances from one another can be readily determined. Those parts of the knives below the hold down or stripper plate are supported at least to some extent by the material being tenderized.

Any tendency of the product to move lengthwise of the conveyor during the tenderizing operation is resisted by plate members 306 detachably bolted to opposite side edges of the plate 168. The lower edges of the plates 306 are beveled to better grip or bit into the product. At this time the crank pin 296 is again moving upwardly. As the tenderizing blades are lifted upwardly out of the product, the brackets 80 on the knife carriage life the unlocking spools 210 to engage the recesses 220 in the pawls 194 thus moving the pawls to the unlocking position. The locking pawls hold the stripper plate firmly in position on top of the product while the tenderizing blades have been withdrawn from the product. After the knives are clear of the product the ram carriage and stripper carriage move freely to their uppermost positions. The rod members 120 normally extend below the plate 102 a distance preferably not less than about the length of the knives 132 so that the knives are never retracted into the plate 102 thus lessening the possibility of contamination of the knives.

Figure 14:
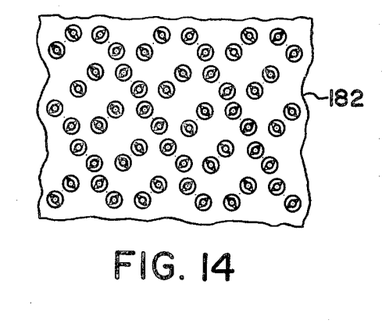
FIG. 14 is a fragmentary view on the line 14—14 of FIG. 2.

The pattern of incisions made in a product P by the knives 138 is illustrated in FIG. 14. The incisions made by the knives of adjacent knife assemblies are at right angles to one another. It is to be understood that various kinds and arrangements of knives can be employed to produce various incision patterns.

The metal parts of the apparatus for the most part are made of stainless steel and the bushings 122 and the plates 124, 106 and 108 and 142 are preferably made of a suitable nontoxic or edible plastic, for example a high density polyethylene or Nylon. The use of such a plastic is particularly advantageous as they are nonporous, will not absorb bacteria, are highly resistant to acids and alkalines, have a clean appearance, become white with age, have adequate weight, do not warp or bend, have low coefficients of friction, are easily cleaned, and are poor conductors of heat.

From the foregoing description of the preferred embodiment of the invention it will be apparent that the objects heretofore enumerated and others have been accommplished and that there has been provided an apparatus for tenderizing a comestible product such as meat by piercing the same with relatively thin long knives which is capable of use on products having a greater thickness than was heretofore possible with like apparatus.

The invention has herein been described as applied to tenderizing meat. Many of the features disclosed herein are applicable to machines for performing other operations on comestible and other products, such as, injecting preservatives and other additives into meat by the substitution of hollow needles and suitable supporting equipment for the knives disclosed herein, as suggested for example, in the U.S. patents of which Greenspan U.S. Pat. No. 3,256,801 is typical. The aforementioned and other modifications and alternative uses can be made without departing from the scope of the invention as set forth in the dependent claims.

What is claimed is:

1. An apparatus for treating a comestible product, such as, meat comprising: a conveyor for conveying a product to be processed; a first carriage having a multiplicity of closely spaced aligned apertures; discrete assemblies each comprising a rod member slidable in each of the aligned apertures of said first carriage and operatively connected thereto by overload release means; a long thin product piercing instrumentality connected to a first plurality of said rod members with their piercing ends facing said conveyor; a plate-like member at the side of said first carriage facing said conveyor and normally spaced from said first carriage and connected to a second plurality of said rod members and having apertures therein through which said intrumentalities extend; power means for reciprocating said first carriage towards and from said conveyor to cause said instrumentalities to pierce a product on said conveyor; a second carriage arranged to move in coordination with movements of said first carriage; a member connected to said second carriage to engage a product being pierced by said instrumentalities; and means for locking said second carriage in position with said member connected thereto engaged with the product while said instrumentalities are being withdrawn from the product.

2. An apparatus for tenderizing a comestible product, such as, meat comprising: a conveyor for conveying a product to be tenderized; a knife carriage having a multiplicity of closely spaced aligned apertures; discrete blade or knife assemblies slidable in each of a first plurality of said aligned apertures of said knife carriage and each assembly comprising a rod member operatively connected to said knife carriage by an overload release means and a long thin tenderizing knife connected to the end of said rod members; a horizontal plate-like member at the side of said knife carriage adjacent to said conveyor and connected to rod-like members slidable in a second plurality of said aligned apertures in said knife carriage for limited movement towards and from said knife carriage and operatively connected thereto by overload release means; said plate-like member having apertures therein through which said knives extend; power means for reciprocating said knife carriage towards and from said conveyor to cause said knives to pierce a product on said conveyor; a stripper plate connected to said stripper carriage to engage a product being pierced; and means for locking said stripper carriage in position with said stripper plate engaging the product while said krives are being withdrawn from the product.

3. An apparatus for tenderizing a comestible product, and/or meat comprising: an intermittently advanced conveyor for conveying a product to be processed; a knife carriage having a plurality of horizontal plate-like members fixed in vertical spaced relation to one another and provided with a multiplicity of closely spaced vertically aligned apertures; discrete blade or knife assemblies each comprising a rod member slidable in each of the aligned apertures of a plurality of said plate-like members and extending to opposite sides thereof and each having flange means at the upper side of an intermediate one of said plate-like members normally engaging the same; a discrete compression spring surrounding each of the rod members and interposed between said flange means thereon and the under side of one of said plate-like member thereabove; a downwardly directed long thin tenderizing knife connected to the lower end of each of said rod member and extending through individual apertures in the lower one of said plate-like member; a further horizontal plate-like member below the lower one of said plate-like member supported by said knife carriage for limited movement towards and from said plate-like members and having apertures therein through which said knives extend; power means for reciprocating said knife carriage to cause said knives to pierce a product therebelow on said conveyor; a stripper carriage arranged to move downwardly and upwardly in coordination with like movements of said knife carriage; a stripper plate connected to said stripper carriage to rest upon the upper surface of a product being pierced; and means for locking said stripper carriage in position with said stripper plate resting upon a product while said knives are being withdrawn from the product.

4. Apparatus for tenderizing meat, comprising: a conveyor for the meat; a plurality of knives each comprising an elongated blade having opposite ends one of which comprises a sharp cutting end for penetrating the meat and severing toughening fibers and tissues in the meat into short pieces; means for reciprocating said knives for projecting and withdrawing said blades into and from meat on said conveyor, each blade being subject to lateral bending between said ends under stress of the type resulting from resistance to said penetrating; a meat retaining means engaging the top of the meat and through which said blades extend; locking means for locking said retaining means against the meat during said withdrawing; means for thereafter releasing said locking means and thus said retaining means from said meat; a blade stabilizer means in addition to said meat retaining means comprising a stabilizer member engaging each of said blades intermediate said blade ends and above said retaining means at the beginning of said penetrating for supporting said blades against said lateral bending; means for positioning said stabilizer member at said intermediate position and at a selected distance from said blade cutting ends and said retaining means at said beginning of said penetrating; means for moving said stabilizer member simultaneously with said knives toward said meat during said beginning of said penetrating; and means for halting said moving of said stabilizer member for projecting said blades further beyond said stabilizer member during completion of said penetrating.

5. The apparatus of claim 4 wherein said means for positioning said stabilizer member maintains said selected distance until said distance of penetrating of said cutting ends into the meat of any blades that do not strike an obstruction is substantially equal to said selected distance.

6. The apparatus of claim 4 wherein said stabilizer means also comprises a mounting member carrying said stabilizer member and there are provided means for positioning said mounting member on said means for reciprocating for movement therewith during said beginning of said penetrating.

7. The apparatus of claim 6 wherein means are provided for yieldably retaining said mounting member on said means for reciprocating during said retracting.

8. The apparatus of claim 4 wherein said stabilizer member comprises a plate having openings therein through which said knives are slidably retained.

9. Apparatus for tenderizing meat, comprising: a conveyor for the meat; a plurality of knives each comprising an elongated blade having opposite ends one of which comprises a sharp cutting end for penetrating the meat and severing toughening fibers and tissues in the meat into short pieces; means for reciprocating said knives for projecting and withdrawing said blades into and from meat on said conveyor, each blade being subject to lateral bending between said ends under stress of the type resulting from resistance to said penetrating; a meat retaining means engaging the top of the meat and through which said blades extend; locking means for locking said retaining means against the meat during said withdrawing; means for thereafter releasing said locking means and thus said retaining means for said meat; a blade stabilizer means in addition to said meat retaining means comprising a stabilizer plate engaging each of said blades intermediate said blade ends and above said retaining means at the beginning of said penetrating for supporting said blades against said lateral bending, said stabilizer plate having openings in which said blades are slidable; means for positioning said stabilizer plate at said intermediate position and at a selected distance from said blade cutting ends and said retaining means at said beginning of said penetrating and for maintaining said selected distance until said distance of penetration of said cutting ends into the meat of any blades that do not strike an obstruction is substantially equal to said selected distance; means for moving said stabilizer plate simultaneously with said knives toward said meat during said beginning of said penetrating; and means for halting said moving of said stabilizer plate for projecting said blades further beyond said stabilizer plate during the completion of said penetrating.

10. An apparatus for tenderizing a comestible product, and/or meat comprising: an intermittently advanced conveyor for conveying a product to be processed; a knife carriage having a plurality of horizontal plate-like members fixed in vertical spaced relation to one another and provided with a multiplicity of closely spaced vertically aligned apertures; discrete blade or knife assemblies each comprising a rod member slidable in each of the aligned apertures of a plurality of said plurality of horizontal plate-like members and extending to opposite sides thereof and each having flange means at the upper side of an intermediate one of said plurality of horizontal plate-like members normally engaging the same; a discrete compression spring surrounding each of the rod members and interposed between said flange means thereon and the under side of one of said plurality of horizontal plate-like members thereabove; a downwardly directed long thin tenderizing knive connected to the lower end of each of said rod member and extending through individual apertures in the lower one of said plurality of horizontal plate-like member; a plurality of further rod member each slidable in aligned apertures of a plurality of said plurality of said plate-like members and extending to opposite sides thereof and each having flange means at the upper side of an intermediate one of said plurality of horizontal plate-like members normally engaging the same; a further discrete compression spring surrounding each of said further rod members and interposed between said flange means thereon and the under side of one of said plurality of horizontal plate-like members thereabove; a further horizontal plate-like member below the lower one of said plurality of horizontal plate-like member supported by said knife carriage for limited movement towards and from said plurality of horizontal plate-like members and having apertures therein through which said knives extend; power means for reciprocating said knife carriage to cause said knives extend; power means for reciprocating said knife carriage to cause said knives to pierce a product therebelow on said conveyor; a stripper carriage arranged to move downwardly and upwardly in coordination with like movements of said knife carriage; a stripper plate connected to said stripper carriage to rest upon the upper surface of a product being pierced; and means for locking said stripper carriage in position with said stripper plate resting upon a product while said knives are being withdrawn from the product.

* * * * *